United States Patent
Zhang et al.

(10) Patent No.: US 8,385,969 B2
(45) Date of Patent: Feb. 26, 2013

(54) METHOD OF TRANSMITTING TPC COMMANDS

(75) Inventors: Zhang Zhang, Beijing (CN); Ke Wang Helmersson, Linkoping (SE); Rong Hu, Sollentuna (SE); Muhammad Kazmi, Bromma (SE); Bengt Lindoff, Bjarred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 370 days.

(21) Appl. No.: 12/864,668

(22) PCT Filed: Jan. 29, 2008

(86) PCT No.: PCT/SE2008/050112
§ 371 (c)(1),
(2), (4) Date: Jul. 27, 2010

(87) PCT Pub. No.: WO2009/096830
PCT Pub. Date: Aug. 6, 2009

(65) Prior Publication Data
US 2010/0323746 A1    Dec. 23, 2010

(51) Int. Cl.
*H04W 52/20*    (2009.01)

(52) U.S. Cl. .......... 455/522; 455/69; 455/420; 455/115; 455/67.13; 370/329

(58) Field of Classification Search .................. 455/522, 455/69, 507, 420, 434, 442, 452.2, 464, 13.4, 455/16, 524, 67.11, 67.13, 115.1, 220; 370/329, 370/312; 375/260
See application file for complete search history.

(56) References Cited

U.S. PATENT DOCUMENTS

| | | | |
|---|---|---|---|
| 2004/0058700 | A1 | 3/2004 | Nilsson et al. |
| 2005/0043054 | A1 | 2/2005 | Asada |
| 2006/0246937 | A1 | 11/2006 | Lindoff |
| 2006/0251151 | A1* | 11/2006 | Nakamura et al. ............ 375/146 |
| 2007/0191047 | A1* | 8/2007 | Catreux-Erceg et al. ..... 455/522 |
| 2009/0067376 | A1* | 3/2009 | Ishii et al. .................... 370/329 |
| 2010/0172279 | A1* | 7/2010 | Chen et al. ................... 370/312 |

FOREIGN PATENT DOCUMENTS

| | | |
|---|---|---|
| GB | 2408420 A | 5/2005 |
| JP | 9312609 A | 12/1997 |
| JP | 11284569 A | 10/1999 |
| JP | 2005123658 A | 5/2005 |

* cited by examiner

*Primary Examiner* — Tan Trinh
(74) *Attorney, Agent, or Firm* — Coats & Bennett, P.L.L.C.

(57) ABSTRACT

In a cellular radio system Transmission Power Control (TPC) power offset is set so that it is adjusted for each transmitting radio base station based on available relevant measurements that reflect the quality of the downlink channel carrying the uplink TPC command whereby an improved performance is obtained. The TPC power offset can for example be based on an estimated uplink Dedicated Physical Control CHannel (DPCCH) SINR, the number of TPC "up" and the number of TPC "down" sent by a radio base station and aggregated UE receiver power or UE transmit power over a number N slots. Also a mobile station used in a cellular radio system supporting soft handover may be adapted to apply TPC discarding thresholds based on the number and the quality of simultaneously received TPC commands. The discarding procedure in the mobile station may also be carried out selectively such that TPC commands that are determined to be unreliable are not discarded but selectively discarded based on how reliable they are determined to be.

6 Claims, 4 Drawing Sheets

METHOD OF TRANSMITTING TPC COMMANDS

TECHNICAL FIELD

The present invention relates to a method, radio base station and a mobile station for transmitting, receiving and using transmission power control commands.

BACKGROUND

Power control and soft handover are two important functionalities of the Code Division Multiple Access (CDMA) air interface. Power control is used to continuously adjust transmission power such that the perceived quality is sufficiently but not excessively good. By controlling transmission power in this manner it is ensured that not more than necessary interference is generated, which in turn results in that the system performance can be improved.

Typically, there are two power control loops, the inner loop and the outer loop. The inner loop power control adjusts transmission power so that the Signal to Interference plus Noise Ratio (SINR) perceived by the receiver is close to a SINR target set for the receiver. The inner loop power control is typically implemented by sending power control commands via so called Transmission Power Control (TPC) bits. The power control command is obtained at the transmitter by comparing the received SINR with the SINR target. To increase the transmission power the TPC bit indicates "up" and to decrease the transmission power the TPC bit indicates "down". The uplink power control command is sent via downlink dedicated physical control channel (DPCCH) for High Speed Downlink Package Access (HSDPA) incapable User Equipment (UE) and associated dedicated physical channel (A-DPCH) or fractional dedicated physical channel (F-DPCH) for HSDPA capable UE. The downlink power control command is sent via uplink DPCCH.

The outer loop power control adjusts the SINR target so that the desired Quality of Service (QoS) requirement is met.

During a soft handover, a mobile station also termed user equipment (UE) is in the overlapping cell coverage area of more than one base station. The communication between the mobile station and base stations takes place concurrently via all connected radio links. Soft handover is a way to decrease the dropping probability when a mobile station moves from one cell to another cell.

During the soft handover, one mobile station is connected to two or more base stations and is power controlled by all the base stations to which the mobile station is connected. Each connected base stations transmits a power control command to the mobile station. The mobile station typically combines the received power control commands from all the base stations in the following way:

A power increase only if all the power control commands indicate "up"

Otherwise the power is decreased

As a result of the above way of combining inner loop power control commands a mobile station in soft handover will more likely decrease its transmission power when the received power control commands are unreliable since any unreliable power control command that is misunderstood as "down" will lead to that the mobile station decrease the transmission power. Hence, the transmission power may be decreased when it should have been increased. Too low uplink power can lead to bad uplink quality.

To solve the problem of risking a bad uplink quality, a TPC discarding mechanism can be employed, as is described in Niclas Wiberg, Hu Rong, Fredrik Gunnarsson, Bengt Lindoff, "Combining of Power Control Commands During Soft Handover in WCDMA", PIMRC2003. Hence, the reliability of received TPC bit can be checked before power control commands are combined. Unreliable TPC commands, i.e. the TPC commands with error probability greater than a predefined threshold, are discarded and only the reliable TPC commands are combined. In the case when all TPC commands are discarded, the transmission power is kept the same, neither increases nor decreases, which is referred as "hold".

The TPC discarding mechanism solves the problem of risking a too low uplink quality caused by unreliable TPC commands. However, the TPC discarding mechanism may cause other problems.

One example of such a problem is illustrated in FIGS. 1a-1b. In FIGS. 1a and 1b, performance and measures when one Enhanced Uplink (EUL) User Equipment (UE) is in soft handover are shown (the UE is also HSDPA capable and uses A-DPCH in downlink). The plots in FIG. 1a are the rise over thermal (RoT) averaged over one sub-frame in the serving and the non-serving cells of the UE.

In FIG. 1b, the upper plot is the SINR of the best A-DPCH in the Active Set (AS) while the lower plot of FIG. 1b is the SINR of the second best A-DPCH in the AS. The TPC power offset relative to the pilot bits carried by A-DPCH is 3 dB.

In the lower plot of FIG. 1b it can be seen that at times the SINR of the second best A-DPCH falls below the TPC discarding threshold. The fact that the second best A-DPCH falls below the TPC discarding threshold leads to a situation where the TPC command carried on that dedicated physical channel (A-DPCH) is discarded by the UE when the discarding mechanism is used. The TPC is regarded as unreliable because the SINR of the A-DPCH is below the TPC discarding threshold 0.5 or −3 dB, which corresponds to a certain TPC error rate.

In the case when the TPC that is discarded indicates "down" while the TPC that is not discarded indicates "up", uplink power will be increased unnecessarily. The excessive increased uplink power results in that the received uplink SINR become higher than the uplink SINR target. This can in turn lead to high RoT peaks, as shown in FIG. 1a and cause the system risks becoming unstable.

This is a typical situation which is often referred as unbalanced uplink and downlink. Usually a soft handover UE does not stay in the situation with unbalanced uplink and downlink for a long time period, and the uplink/downlink unbalanced situation occurs only for a very short time period, as shown in FIG. 1a where one high RoT pulse appears after 3 s.

However, a high RoT pulse will also cause an uplink power rush for users who are not in soft handover. Such a high and short RoT pulse is difficult for Uu load control to reduce via a Node B scheduler since there are measurement and operation delays.

One solution is to increase the reliability of TPC by setting a higher quality target for the relevant downlink channel carrying the uplink TPC command, for example the A-DPCH.

Another solution is to increase the TPC transmission power so that the TPC is more reliably received. The transmission power on TPC bit can be increased by increasing the TPC power offset, which is supported in 3GPP. The TPC power offset can be varied from 0 dB to 6 dB, see 3GPP TS 25.331, "Radio Resource Control (RRC)", v.7.4.0. The higher the TPC power offset, the lower the TPC error rate. Dynamical setting of TPC power offset based on some relevant quality is supported in 3GPP, see 3GPP TS 25.214, "Physical layer procedures (FDD)", v.7.4.0 by signaling the quality measurement, see 3GPP TS 25.433, "UTRAN Iub interface Node B Application Part (NBAP) signaling)", v.7.5.0. Also, in WO2006/081874 a method to adjust the TPC power offset was proposed, where the TPC power offset is increased based on an event triggered report from user in the case when a number of M unreliable TPC commands are registered during a given time period.

However, to set a higher quality target for the relevant downlink channel has drawbacks. It requires a higher downlink power consumption on the channel used, which causes a higher downlink interference. This will also negatively impact the downlink performance. To set a higher TPC power offset can mitigate the uplink power rush problem to some extent. In the case when a soft handover is used and a user has more than two radio links in the active set while uplink and downlink are unbalanced, the uplink TPC discarding probability can be high for one of the downlink radio link set with relatively bad quality.

Hence, there exists a need for a method and a system that improves over existing techniques for transmitting and using TPC commands.

SUMMARY

It is an object of the present invention to overcome or at least reduce some of the problems associated with existing methods of transmitting and using TPC commands.

It is another object of the present invention to provide a method, system and a device that is capable of improving the performance over existing cellular radio systems.

These objects and others are obtained by the method, radio base station and mobile station as set out in the appended claims. Thus, by setting TPC power offset so that it is adjusted for each transmitting radio base station based on available relevant measurements that reflect the quality of the downlink channel carrying the uplink TPC command an improved performance is obtained. The TPC power offset can for example be based on an estimated uplink Dedicated Physical Control CHannel (DPCCH) SINR at the radio base station, the number of TPC "up" and the number of TPC "down" sent by a radio base station and aggregated UE receiver power or UE transmit power over a number N slots.

In accordance with one embodiment a mobile station used in a cellular radio system supporting soft handover may also be adapted to apply TPC discarding thresholds based on the number and the quality of simultaneously received TPC commands. The discarding procedure in the mobile station may also be carried out selectively such that TPC commands that are determined to be unreliable are not discarded but selectively discarded based on how reliable they are determined to be.

BRIEF DESCRIPTION OF THE DRAWINGS

The present invention will now be described in more detail by way of non-limiting examples and with reference to the accompanying drawings, in which.

DETAILED DESCRIPTION

Figure 2:
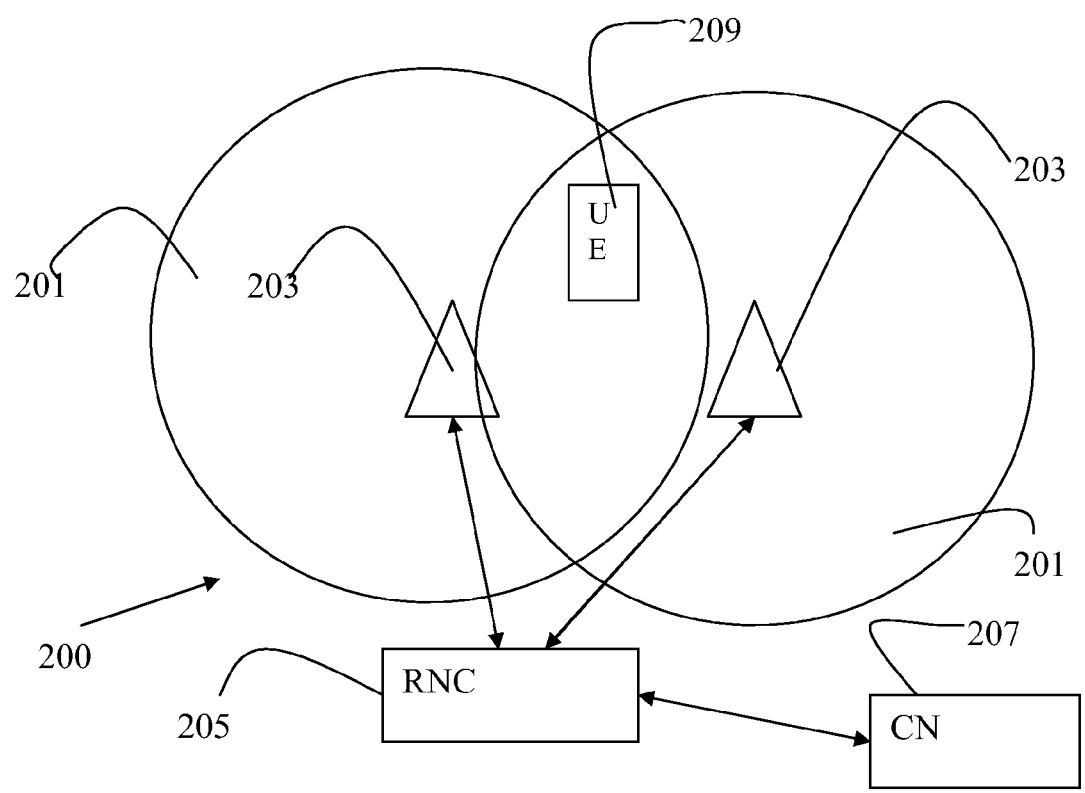
FIG. 2 is a view of a cellular radio system.

In FIG. 2, a general view of a cellular radio system 200 is shown. The system 200 comprises a number of cells 201 together covering a geographical area in which the system 200 provides radio access. Each cell 201 is associated with a radio base station 203, which communicates with a Radio Network Controller (RNC) 205. The RNC is in turn connected to a Core Network (CN) 207. In the geographical area covered by the cellular radio system a mobile station here termed user equipment (UE) 209 may connect to the cellular radio system via a radio base station 203 over an air-interface. In case the cellular radio system and the mobile station support soft handover the UE 209 may be connected to more than one radio base station 203 simultaneously.

In accordance with the present invention the power offset of a Transmission Power Control (TPC) command is adjusted depending on some available measurements which reflect the quality of the downlink channel carrying the uplink TPC command. The adjustment is preferably performed at a radio base station (RBS) 203. Some measurements can be derived at the base station and some may be derived by a mobile station connected to the radio base station and transmitted as feedback from a mobile station to the radio base station.

Measurements that can be derived at the base station include:
  an estimated uplink DPCCH SINR;
  statistics related to the uplink TPC commands that have been sent by the base station;
  variation of mobile station/User Equipment (UE) power received at the base station over last N slots, where N may be a configurable parameter. The received UE power can be regarded as "hold" in one slot if the difference between the received UE power in this slot and that in the previous slot is very small.

Also it should be noted that the received UE power can also be obtained via the existing UE measurement reports, see 3GPP TS 25.215, "Physical layer measurements (FDD)", v.7.4.0, where the transmission power of the mobile station and power headroom of user are estimated in the mobile station/user equipment and reported back to the radio base station.

Measurements can, as stated above, also be performed at a mobile station. Hence, based on decoded TPC commands or the transmission power level over last N slots, a mobile station/user equipment can be adapted to examine and report accumulated changes in transmission power back to the radio base station. Such reporting may involve procedure as described below:

The system can be adapted to determine and configure when a mobile station/user equipment starts to examine the changes in transmission power. In another embodiment the mobile station/user equipment may be configured to decide when to start the examination on the transmission power then report to the system.

The report can be sent either periodically or be event triggered. The measurement report may include: at least one of the following
  The accumulated change in the UE transmission power over last N slots
  The number of slots that UE transmission power is "hold" over last N slots In case when the report is event triggered, the trigger event may for example be when the accumulated increase in UE transmission power is more than a predetermined amount x dB or when the UE transmission power has been held for more than m out of N slots.

This report from the mobile station/user equipment can be transmitted back to the radio base station using either RRC signaling or some lower layer, e.g. layer1, layer2, or Media Access Control (MAC) signaling or some other suitable signaling channel available to the mobile station/user equipment.

TPC power offset adjustment mechanism in base station

The measurement made available to a radio base station, either directly in the radio base station or reports received from a mobile station/user equipment is processed at each base station to obtain measurements that reflect the quality of the downlink channel carrying the uplink TPC commands. In a preferred embodiment at least one of the following measurements are obtained:

- The accumulated change in the received UE power over last N slots
- The number of slots that the received UE power is considered to be "hold" over last N slots In accordance with one embodiment, each base station may increase the power offset on TPC command if any of the following conditions is satisfied depending on available measurements and post-processed measurements and where N may be a configurable parameter:

- If the estimated uplink DPCCH SINR is higher than a margin above the DPCCH SINR target or;
- If the number of TPC "down" commands sent from the base station is more than a predefined margin over the number of TPC "up" commands; or
- If, based on the TPC commands sent from base station over last N slots, the base station can estimate at least how much decreasing in UE power is expected if the TPC commands are correctly received at the mobile side. If the accumulated decreasing in user power is less than what is expected and the difference exceeds a certain margin, the power offset on TPC command is increased, or
- If the number of slots with "hold" UE power over last N slots exceeds a certain threshold Moreover, each base station may be set to decrease the power offset on TPC commands if the number of slots that UE power is "hold" over last N slots is less than a certain threshold and if:

- The estimated uplink DPCCH SINR is lower than the DPCCH SINR target plus a margin or,
- The number of TPC "down" commands that is sent from the base station is not more than a predefined margin over the number of TPC "up" commands.

Note that the margin (threshold) used to trigger decrease on TPC power offset can be different from the margin (threshold) used to trigger increase on TPC power offset.

In addition, a TPC power offset may also be adjusted based on Common Pilot Channel (CPICH) quality either in terms of CPICH Ec/Io or CPICH Received Signal Code Power (RSCP). This may be beneficial since CPICH quality is one good measure that reflects the downlink quality and increasing the uplink TPC power offset when the corresponding downlink quality is low is likely to make the uplink TPC more reliably received. Moreover, the CPICH quality based TPC power offset adjustment may be combined with the TPC power offset adjustment proposed in section described above in various ways: For example, for each UE the Radio Network Controller (RNC) can be set to adjust the uplink TPC power offset for each radio base station in the active set of that UE based on the CPICH quality reported by the UE and send the uplink TPC power offset to the radio base stations. Each radio base station may further adjust the uplink TPC power offset received from the radio network controller according to any criteria described above.

In accordance with one embodiment an upper bound and a lower bound may be applied on the TPC power offset per radio link set. The upper bound is set to prevent the TPC power offset becoming too large and resulting in an unnecessary high transmission power. It should be noted that the upper bound can be different for each radio link set and some of them can be higher than 6 dB if it is necessary.

Figure 3:
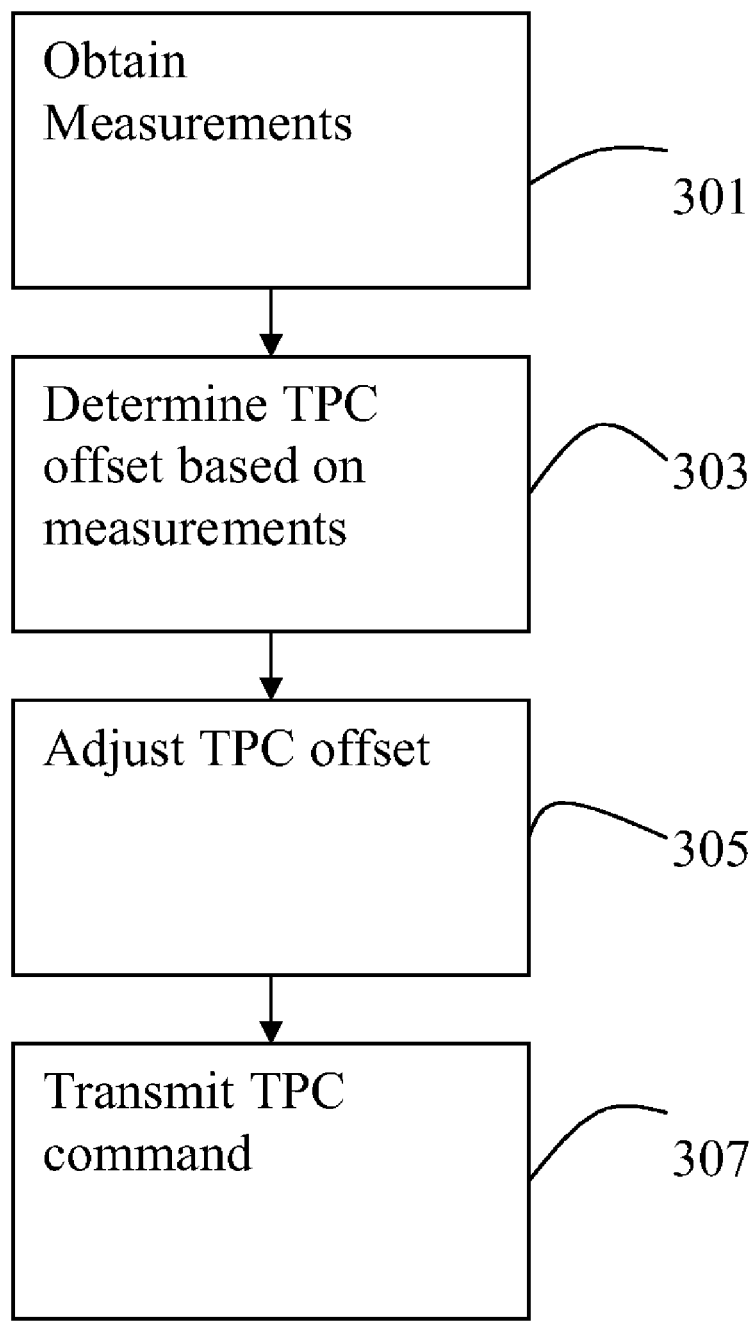
FIG. 3 is a flow chart illustrating different steps performed when adjusting transmitting power control commands in a node of a cellular radio system.
Figure 4:
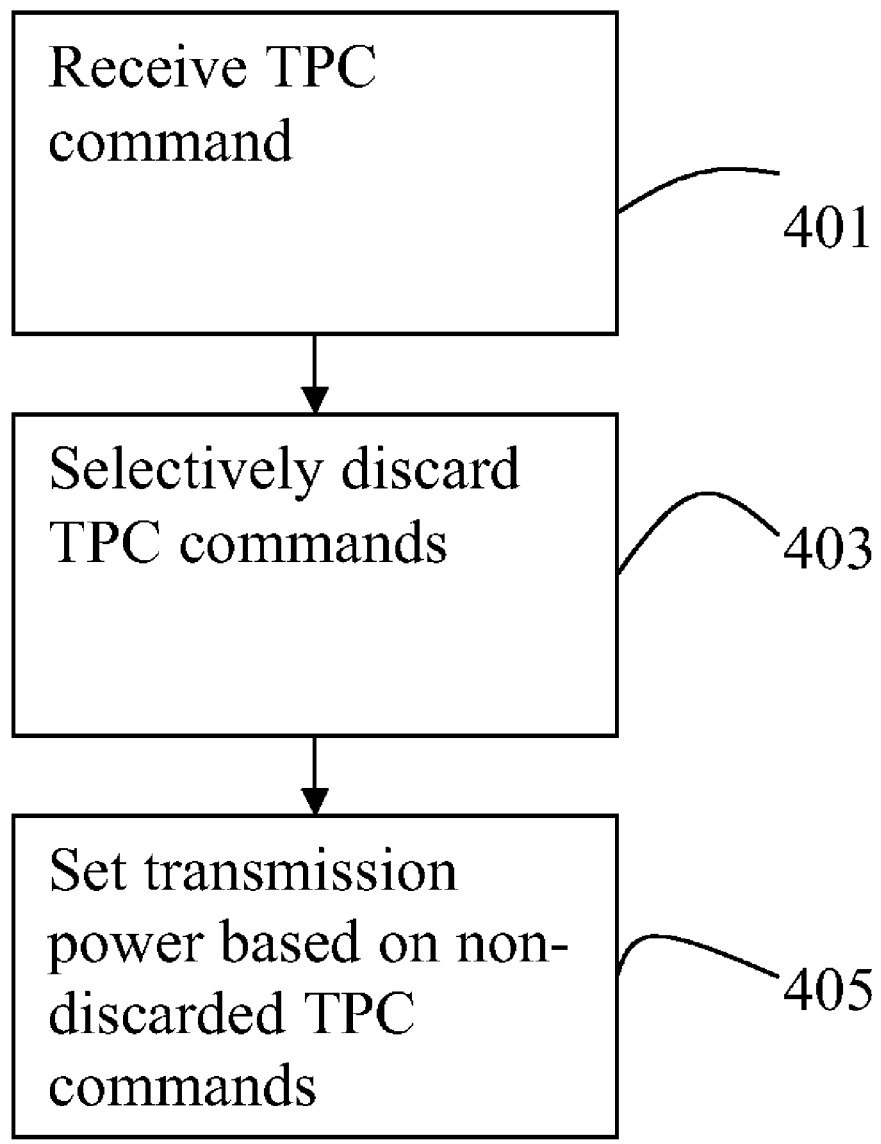
FIG. 4 is a flow chart illustrating different steps performed when discarding power control commands in a user equipment for use in a cellular radio system.

In FIG. 3 a flowchart illustrating the procedural steps performed when adjusting the power offset of a TPC command is shown. Thus first in a step 301 measurements relating to the quality of the downlink channel carrying the uplink TPC command are obtained. As described above the measurements may be direct measurements at the radio base station 203 or reports from some other entity such as a mobile station 209. Next, in a step 303, a TPC power offset is determined based on the obtained measurements. The offset determination can for example be determined in accordance with any of the procedures outlined above.

The TPC power offset is then adjusted, i.e. increased, decreased or kept the same based on the determined power offset in step 303 in a step 305. Finally the TPC commands are transmitted using the adjusted power offset in a step 307.

In accordance with one embodiment a Transmission Power Control commands may be selectively discarded by the user equipment. One purpose of implementing TPC command discarding is to avoid that the uplink quality drops as a result of many unreliably TPC commands received at a user terminal. In accordance with the present invention a TPC command is considered to be unreliable when the probability that the terminal cannot correctly interpret the TPC command is above some, high, probability.

Considering the fact that TPC command discarding has less impact on performance for non-soft handover users, in which only one TPC command is received at mobile station. This is because the fact that the probability that one TPC command is incorrectly received is much lower than the probability that at least one TPC command out of N TPC command (N>1) is incorrectly received given that all the TPC commands have the same error probability. On the other hand, the more the TPC commands received (or more exactly, adopted), the better the quality (i.e. the lower the error probability) these TPC commands should have to have the same probability that at least one TPC command is incorrectly received, A procedure involving a selective TPC command discarding for the case when there are more than one TPC commands received at user terminal may be used. Hence, the selective TPC command discarding procedure is configured such that the TPC discarding threshold is based on the number of TPC commands that the discarding criteria are evaluated on. In fact this may result in the discarding threshold is relaxed allowing a higher TPC error rate when there are only a few unreliable TPC commands. The selection of TPC discarding may be set as follows when a user terminal receives N TPC commands simultaneously:

- Discard all the N TPC commands if all the TPC commands have an error rate higher than a preset discarding threshold $Thr_n$
- Otherwise discard the N-1 TPC commands if they all have an error rate higher than the discarding threshold $Thr_{n-1}$
- Otherwise discard the N-m TPC commands if they all have an error rate higher than the discarding threshold $Thr_{n-m}$
- Otherwise discard the worst TPC command if it has an error rate higher than the discarding threshold $Thr_1$ Here $Thr_n \leq Thr_{n-1} \leq \ldots \leq Thr_{n-m} \leq \ldots \leq Thr_1$. This ensures that the more the TPC commands used by the user, the better the quality of each TPC command, thus the probability of unreliably decoded TPC commands is kept more or less at the same level, The specific discarding thresholds setting depends on UE implementation.

In an alternative embodiment the TPC command discarding procedure may be set to:

Discard all the N TPC commands if all the TPC commands have an error rate higher than the discarding threshold $Thr_{discard}$ Otherwise keep the best TPC command which error rate is higher than $Thr'_n$ and not higher than the holding threshold $Thr_{hold}$ Here $Thr_{discard}<=Thr_{hold}$. The thresholds setting depends on UE implementation.

Using the method and system as described herein including the use of a selective TPC discarding will decrease the probability of uplink power and RoT rushes and at the same time keep the uplink quality at substantially the same level.

The invention claimed is:

1. A mobile station configured to receive transmission power control commands from a number N of at least two radio base stations simultaneously, said mobile station configured to:
   discard all N simultaneously received transmission power control commands from the N radio base stations, if all the received transmission power control commands have an error rate higher than a first discarding threshold, and to perform at least one of the following steps:
   discard N-1 of the N simultaneously received transmission power control commands, if the power control commands all have an error rate higher than a second discarding threshold, the second discarding threshold greater than or equal to the first discarding threshold; and
   keep the best transmission power control command for which the error rate is higher than the first discarding threshold but not higher than a holding threshold.

2. The mobile station according to claim 1, wherein the mobile station is further configured to discard the N-m transmission power control commands, where m<N, if the power control commands all have an error rate higher than a third discarding threshold, said third discarding threshold greater than or equal to the second discarding threshold.

3. The mobile station according to claim 2, wherein the mobile station is further configured to discard the worst transmission power control command if it has an error rate higher than a forth discarding threshold, said forth discarding threshold greater than or equal to the third discarding threshold.

4. A method of discarding received transmission power control commands in a mobile station configured to receive transmission power control commands from a number N of at least two radio base stations simultaneously, said method comprising:
   discarding all N simultaneously received transmission power control commands from the N radio base stations if all the received transmission power control commands have an error rate higher than a first discarding threshold; and
   at least one of the following steps:
   discarding the N-1 transmission power control commands if the power control commands all have an error rate higher than a second discarding threshold, the second discarding threshold greater than or equal to the first discarding threshold; and
   keeping the best transmission power control command for which the error rate is higher than the first discarding threshold but not higher than a holding threshold.

5. The method according to claim 4, further comprising the step of discarding the N-m transmission power control commands, where m<N, if the power control commands all have an error rate higher than a third discarding threshold, the third discarding threshold greater than or equal to the second discarding threshold.

6. The method according to claim 5, further comprising the step of discarding the worst transmission power control command if it has an error rate higher than a fourth discarding threshold, the fourth discarding threshold greater than or equal to the third discarding threshold.

* * * * *

UNITED STATES PATENT AND TRADEMARK OFFICE
CERTIFICATE OF CORRECTION

PATENT NO. : 8,385,969 B2  
APPLICATION NO. : 12/864668  
DATED : February 26, 2013  
INVENTOR(S) : Zhang et al.

Page 1 of 1

It is certified that error appears in the above-identified patent and that said Letters Patent is hereby corrected as shown below:

On the Title Page, in Item (75), under "Inventors", in Column 1, Line 2, delete "Linkoping" and insert -- Linköping --, therefor.

On the Title Page, in Item (75), under "Inventors", in Column 1, Line 3, delete "Sollentuna (SE);" and insert -- Beijing (CN); --, therefor.

On the Title Page, in Item (75), under "Inventors", in Column 1, Line 3, delete "Muhammad Kazmi," and insert -- Muhammad Ali Kazmi, --, therefor.

On the Title Page, in Item (75), under "Inventors", in Column 1, Line 4, delete "Bjarred" and insert -- Bjärred --, therefor.

Figure 1A:
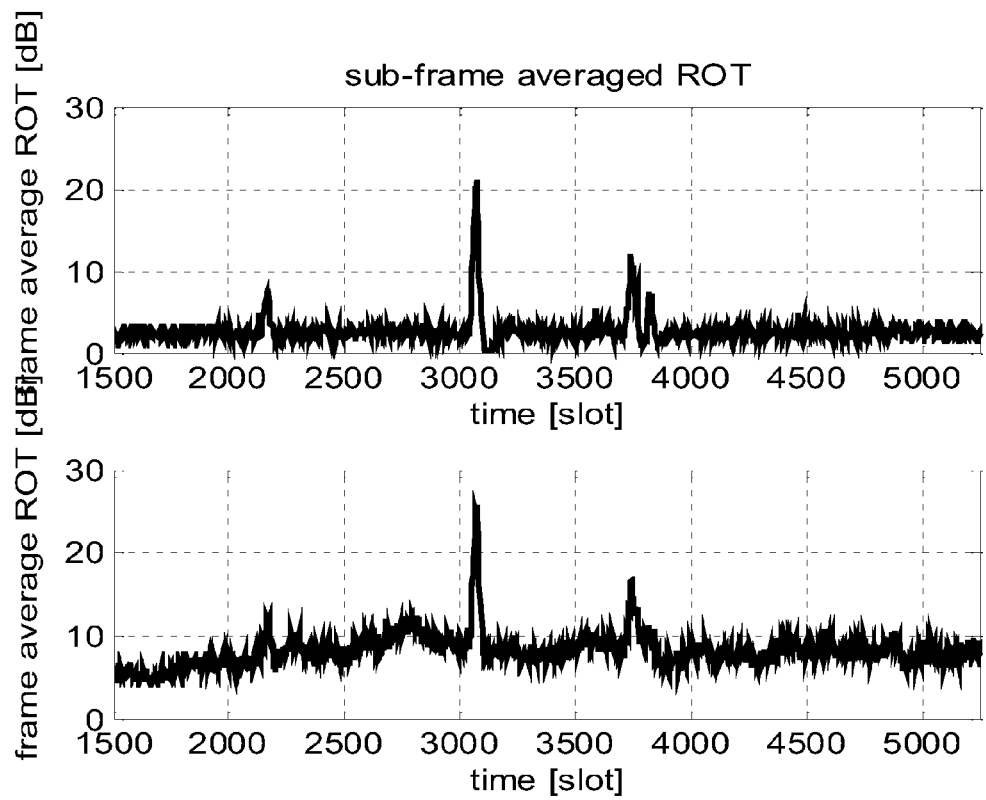
FIGS. 1a and 1b are views illustrating variation of different parameters in a cellular radio system.

In the Drawings:

In Fig. 1a, Sheet 1 of 4, delete " ROT [dB]ame average " and insert -- ROT [dB] frame average --, therefor.

Figure 1B:
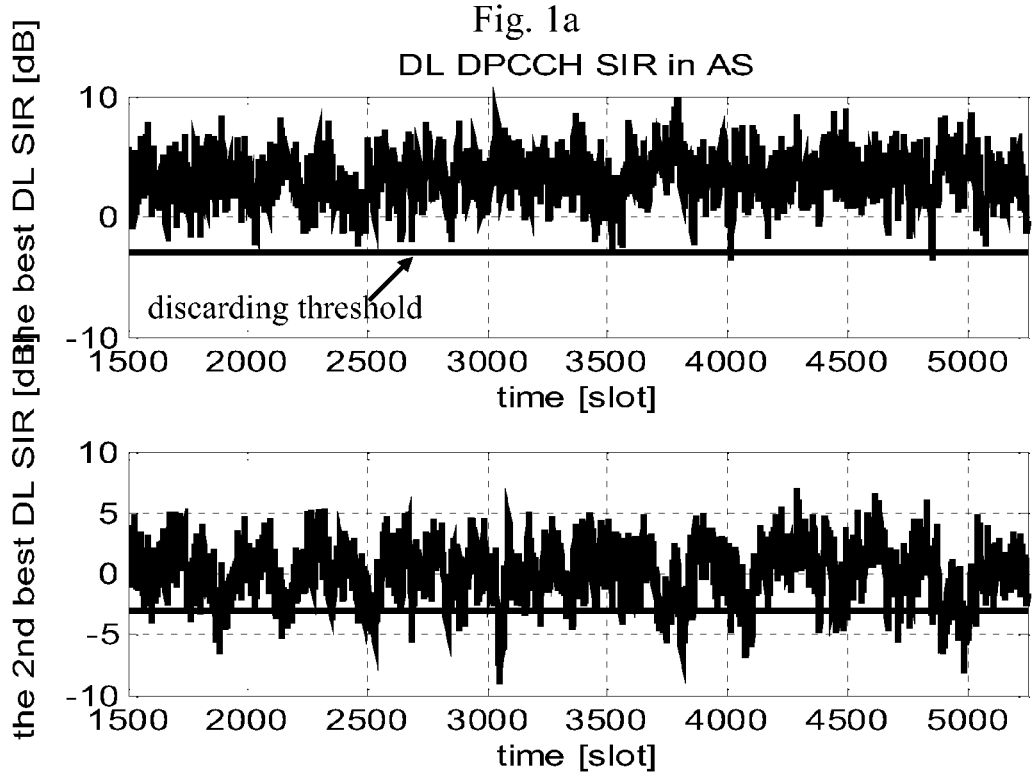

In Fig. 1b, Sheet 1 of 4, delete " SIR [dB]he best " and insert -- SIR [dB] the best --, therefor.

In the Specifications:

In Column 6, Line 62, delete "<=Thr n-m<=" and insert -- <=Thr$_{n-m}$<= --, therefor.

In the Claims:

In Column 8, Line 6, in Claim 3, delete "a forth discarding threshold, said forth" and insert -- a fourth discarding threshold, said fourth --, therefor.

Signed and Sealed this  
Second Day of July, 2013

Teresa Stanek Rea  
*Acting Director of the United States Patent and Trademark Office*